United States Patent
Watanabe et al.

(10) Patent No.: US 12,237,734 B2
(45) Date of Patent: Feb. 25, 2025

(54) MOTOR AND METHOD OF MANUFACTURING STATOR

(71) Applicant: SINFONIA TECHNOLOGY CO., LTD., Tokyo (JP)

(72) Inventors: Shunya Watanabe, Tokyo (JP); Nobuo Aruga, Tokyo (JP); Mamoru Kosaki, Tokyo (JP); Masayasu Kayukawa, Tokyo (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 256 days.

(21) Appl. No.: 17/623,514

(22) PCT Filed: Jun. 26, 2020

(86) PCT No.: PCT/JP2020/025194
§ 371 (c)(1),
(2) Date: Dec. 28, 2021

(87) PCT Pub. No.: WO2021/002287
PCT Pub. Date: Jan. 7, 2021

(65) Prior Publication Data
US 2022/0360152 A1    Nov. 10, 2022

(30) Foreign Application Priority Data
Jul. 4, 2019    (JP) ................. 2019-125091

(51) Int. Cl.
*H02K 15/12*    (2006.01)
*H02K 3/12*    (2006.01)
(Continued)

(52) U.S. Cl.
CPC ............... *H02K 15/12* (2013.01); *H02K 3/12* (2013.01); *H02K 3/24* (2013.01); *H02K 3/28* (2013.01); *H02K 9/197* (2013.01)

(58) Field of Classification Search
CPC ............ H02K 15/12; H02K 3/12; H02K 3/24; H02K 3/28; H02K 9/197; H02K 5/15; H02K 5/203; Y02T 10/64
See application file for complete search history.

(56) References Cited

U.S. PATENT DOCUMENTS 6,891,302 B1 *   5/2005   Gabrys ................. H02K 19/06
                                                            310/266
2008/0143203 A1   6/2008   Purvines et al.
2014/0091651 A1   4/2014   Dorfstatter et al.

FOREIGN PATENT DOCUMENTS

DE    102017221836 A1 *   6/2019   ............... H02K 1/20
EP      0 503 093 A1        9/1992
(Continued)

OTHER PUBLICATIONS

JP2011101461A English translation (Year: 2023).*
(Continued)

*Primary Examiner* — Christopher M Koehler
*Assistant Examiner* — Viswanathan Subramanian
(74) *Attorney, Agent, or Firm* — WHDA, LLP (57) ABSTRACT

It is possible to reduce a rise in temperature of a rotor by reducing the temperature of a stator. The motor 1 includes a stator 5, and a rotor 4, which is disposed with a gap from the stator 5, being arranged in a housing 2, in which the stator 5 is provided with an annular yoke and a plurality of teeth protruding from an inner peripheral portion of the yoke toward the rotor 4; slots in which coils 6 wound around the teeth are arranged are respectively formed between the teeth that are adjacent to each other; a mold resin portion 30 in which the stator 5 and the coils 6 are molded is provided; the mold resin portion 30 includes a flow path 32 formed within at least one slot among a plurality of slots; and the flow path 32 is supplied with a cooling medium.

8 Claims, 8 Drawing Sheets

(51) Int. Cl.
    *H02K 3/24*     (2006.01)
    *H02K 3/28*     (2006.01)
    *H02K 9/197*    (2006.01)

(56)            References Cited

FOREIGN PATENT DOCUMENTS

| JP | 4-145859 A      | 5/1992 |
| JP | 2007-236098 A   | 9/2007 |
| JP | 2010-172129 A   | 8/2010 |
| JP | 2011/101461 A   | 5/2011 |
| JP | 2014-23387 A    | 2/2014 |
| JP | 2015-97430 A    | 5/2015 |
| WO | 2013/128881 A1  | 9/2013 |

OTHER PUBLICATIONS

JP2014023387A English translation (Year: 2023).*
DE 102017221836 A1 English translation (Year: 2024).*
Office Action dated Mar. 28, 2023, issued in counterpart JP application No. 2019-125091, with English translation. (7 pages).
International Search Report dated Sep. 8, 2020, issued in counterpart International Application No. PCT/JP2020/025194 (2 pages).
Extended Supplementary European Search Report dated Jun. 12, 2023, issued in counterpart EP Application No. 20834281.6. (10 pages).

* cited by examiner

MOTOR AND METHOD OF MANUFACTURING STATOR

TECHNICAL FIELD

The present invention relates to a motor including a coil wound on a stator and a method of manufacturing a stator.

BACKGROUND ART

Conventionally, as a motor, there has been known a product including a rotor, a cylindrical stator arranged around the rotor, and coils wound on the stator in a longitudinal direction thereof, in which the stator is supported inside a housing. The coils are arranged in slots of the stator.

In a motor of Patent Document 1, in order to improve heat dissipation of a stator, hole portions are formed in a laminated plate of the stator and those hole portions are made to communicate with each other, whereby a coolant flow path is formed in a yoke portion of the stator. In the motor of the above, the stator is cooled by supplying a coolant to the flow path formed in the yoke portion of the stator.

PRIOR ART DOCUMENT

Patent Document

Patent Document 1: Japanese Unexamined Patent Application Publication No. H4-145859

SUMMARY OF THE INVENTION

Technical Problem

However, in the motor of Patent Document 1, since the coolant flow path is formed in the yoke portion of the stator, a temperature distribution is produced in the stator due to heat conduction, and the temperature of a teeth portion around which coils are wound in the stator becomes higher than that of the yoke portion. Accordingly, there arises a problem that the temperature of a rotor is increased due to radiation from the stator. In particular, in a motor in which the rotor is rotated in a space in which the pressure is reduced as compared to atmospheric pressure (i.e., a decompression space), generation of a convection flow is significantly reduced even when the rotor is rotated, so the heat of the rotor is likely to be confined, and the rotor is likely to be at high temperature.

Hence, the present invention provides a motor capable of reducing a rise in temperature of a rotor by reducing the temperature of a stator, and a method of manufacturing a stator.

Solution to Problem

The present invention has implemented the following means in order to achieve such an object.

That is, a motor according to the present embodiment corresponds to a motor including a stator, and a rotor which is disposed with a gap from the stator, the motor being arranged in a housing, and the motor is characterized in that the stator is provided with a plurality of laminated plates forming an annular yoke and a plurality of teeth protruding from an inner peripheral portion or an outer peripheral portion of the yoke toward the rotor; slots in which coils wound around the teeth are arranged are respectively formed between the teeth that are adjacent to each other; the stator includes a mold resin portion in which the plurality of laminated plates and the coils are molded; the mold resin portion includes a flow path formed within at least one slot among the slots; and the flow path is supplied with a cooling medium.

Consequently, in the motor according to the present invention, the mold resin portion in which the plurality of laminated plates and the coils are molded in the stator includes the flow path for a cooling medium formed within at least one slot of the stator. Thus, it is possible to form a stator including a flow path to which a cooling medium is supplied by using a conventional laminated plate and without using a dedicated laminated plate for forming the flow path to which the cooling medium is supplied. In addition, since the flow path to which the cooling medium is supplied is formed in the mold resin portion, it is possible to suppress an increase in eddy-current loss which is caused by a magnetic flux generated in the stator or the rotor, thereby preventing the motor efficiency from decreasing.

The motor according to the present invention is characterized in that the flow path is disposed closer to the rotor side than the coil within the slot.

Consequently, in the motor according to the present invention, the flow path to which the cooling medium is supplied is disposed closer to the rotor side than the coil within the slot. Therefore, since the flow path is disposed near a gap (a gap portion) between the stator and the rotor, which causes the temperature of a portion near the rotor in the stator to be lowered, it is possible to reduce a rise in temperature of the rotor caused by radiation from the stator. Accordingly, the life of a bearing is increased by suppressing an increase in the bearing temperature of a motor shaft supporting the rotor.

The motor according to the present invention is characterized in that the housing includes a cylindrical portion, and two cover members which close both sides of the cylindrical portion; the mold resin portion includes a plurality of flow paths which pass through every one of the slots, respectively, and annular groove portions, which are formed on both end surfaces of the mold resin portion, respectively, and communicate with the plurality of flow paths; an outer peripheral portion of the mold resin portion is in contact with an inner peripheral surface of the cylindrical portion; and both end portions of the mold resin portion are disposed to be opposed to the two cover members, respectively.

Consequently, in the motor according to the present invention, the annular groove portions, which communicate with the plurality of flow paths that pass through every one of the slots, respectively, are formed on the both end surfaces of the mold resin portion. Therefore, by allowing a cooling medium to be supplied to the groove portions of the mold resin portion, the cooling medium is made to pass through the plurality of flow paths.

The motor according to the present invention is characterized in that two annular seal members, which are disposed radially inside and radially outside the groove portion, respectively, are disposed in places between the both end surfaces of the mold resin portion and the two cover members.

Consequently, in the motor according to the present invention, the two annular seal members, which are disposed radially inside and radially outside the groove portion, respectively, are disposed in places between the both end surfaces of the mold resin portion and the two cover members. Therefore, it is possible to prevent the cooling medium from leaking out inside the motor, and also maintain the interior of the housing 2 in a decompressed state.

In the motor according to the present invention, the rotor is rotated in a decompression space.

Consequently, in the motor according to the present invention, the rotor is configured to rotate in the decompression space, and in the decompression space, generation of a convection flow is significantly reduced even when the rotor is rotated, and thus the heat of the rotor is confined. Even in such a case, the temperature of the rotor can be lowered in the present invention.

A method of manufacturing a stator according to the present invention corresponds to a method of manufacturing a stator including a plurality of laminated plates forming an annular yoke and a plurality of teeth protruding from an inner peripheral portion or an outer peripheral portion of the yoke toward a rotor, and the method is characterized by including: a first step of winding coils around the teeth, and arranging the plurality of laminated plates on which the coils are wound, inside a lower die for mold forming; a second step of arranging, in the interior of the lower die for mold forming, a first cutting die for forming an inner peripheral surface or an outer peripheral surface of the stator on the inner side or the outer side of the plurality of laminated plates on which the coils are wound; a third step of arranging, in the interior of the lower die for mold forming, a second cutting die for forming a flow path for a cooling medium, within at least one slot of a plurality of slots formed between the teeth that are adjacent to each other in the plurality of laminated plates on which the coils are wound; a fourth step of forming a forming die by mounting an upper die for mold forming onto the lower die for mold forming, and pouring resin into the forming die and curing the resin; and a fifth step of taking out from the forming die, after the resin has been cured in the forming die, a mold resin portion in which the plurality of laminated plates and the coils are molded, and removing the first cutting die and the second cutting die from the mold resin portion.

Consequently, in the method of manufacturing a stator according to the present invention, the mold resin portion in which the plurality of laminated plates and the coils are molded in the stator includes the flow path for a cooling medium formed within at least one slot. Thus, it is possible to form a stator including a flow path to which a cooling medium is supplied by using a conventional laminated plate and without using a dedicated laminated plate for forming the flow path to which the cooling medium is supplied. In addition, since the flow path to which the cooling medium is supplied is formed in the mold resin portion, in the motor including the stator and the rotor, it is possible to suppress an increase in eddy-current loss which is caused by a magnetic flux generated in the stator or the rotor, thereby preventing the motor efficiency from decreasing.

Advantageous Effect of the Invention

According to the present invention described above, it is possible to form a stator including a flow path to which a cooling medium is supplied by using a conventional laminated plate and without requiring a dedicated laminated plate for forming the flow path to which the cooling medium is supplied.

DESCRIPTION OF THE EMBODIMENT

In the following, embodiments of the present invention will be described with reference to the drawings.

Figure 1:
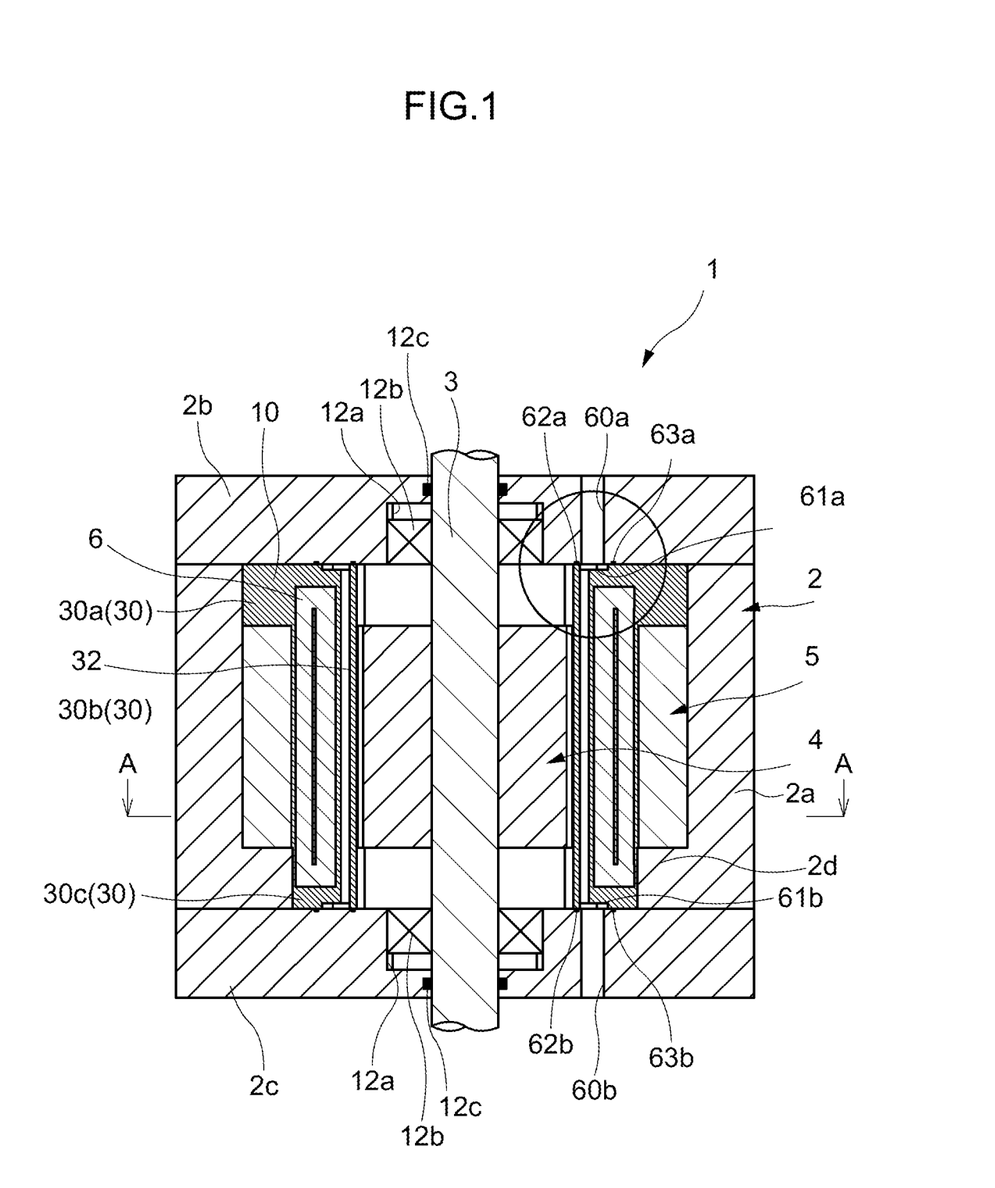
FIG. 1 is a longitudinal sectional view of a motor according to an embodiment of the present invention.
Figure 2:
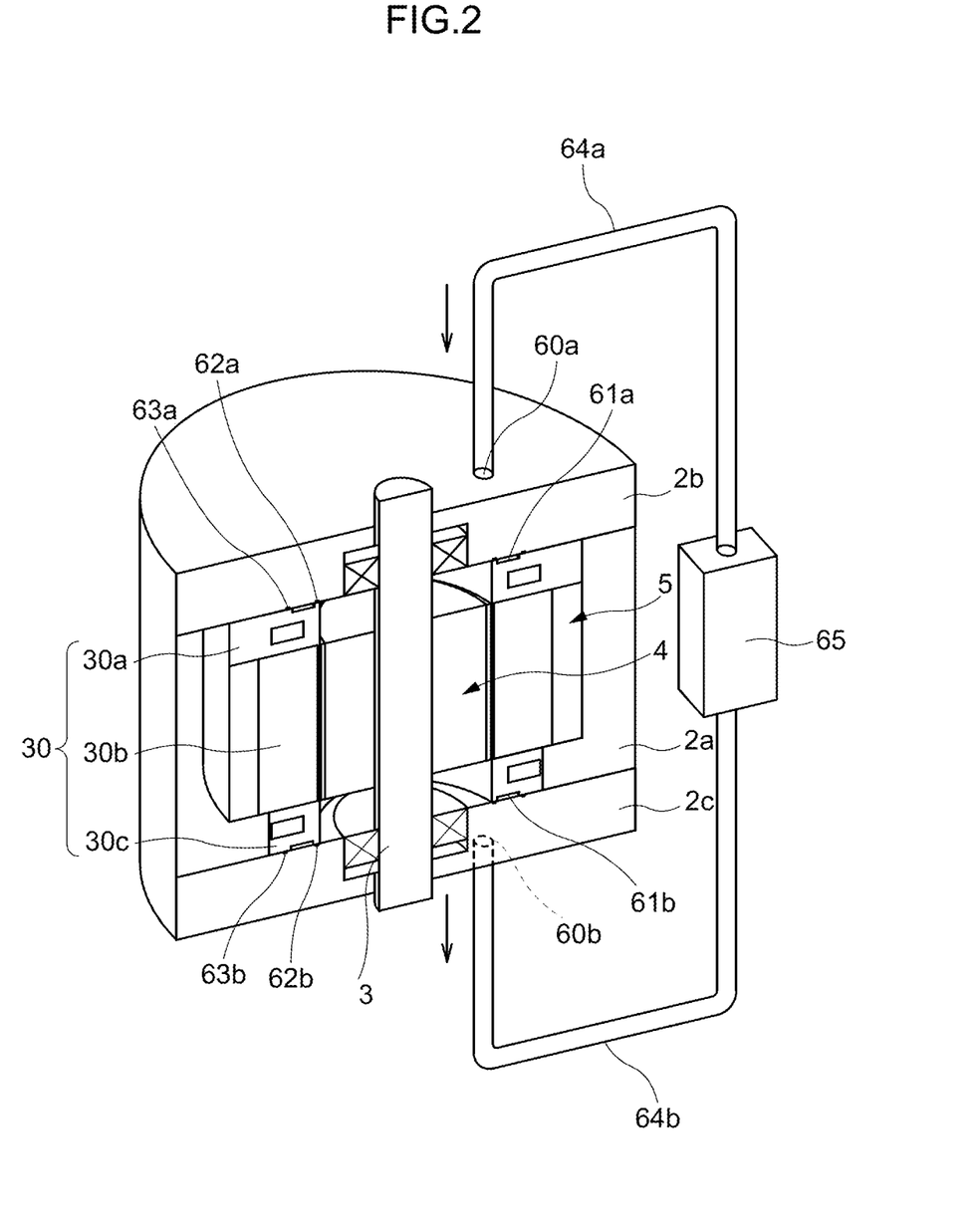
FIG. 2 is a cross-sectional perspective view of the motor of FIG. 1.

As illustrated in FIGS. 1 and 2, a motor 1 includes a housing 2, and inside the housing 2, there are provided a rotor (a movable element) 4 which is rotated about an axis of a motor shaft 3 corresponding to a rotary shaft, and a stator (a stator element) 5 which is fixed to the housing 2 such that a small gap (an air gap) is so formed as to surround the outer periphery of the rotor 4. The stator 5 is press-fitted and fixed to the housing 2. Since a well-known product can be applied to the rotor 4, a detailed description thereof is omitted.

The motor 1 may be used, for example, as an aircraft electric motor or a drive source of an actuator of a robot, etc., and may also be used as a drive source of a pump or a compressor, and a flywheel electrical storage device, or used for other purposes.

Figure 3:
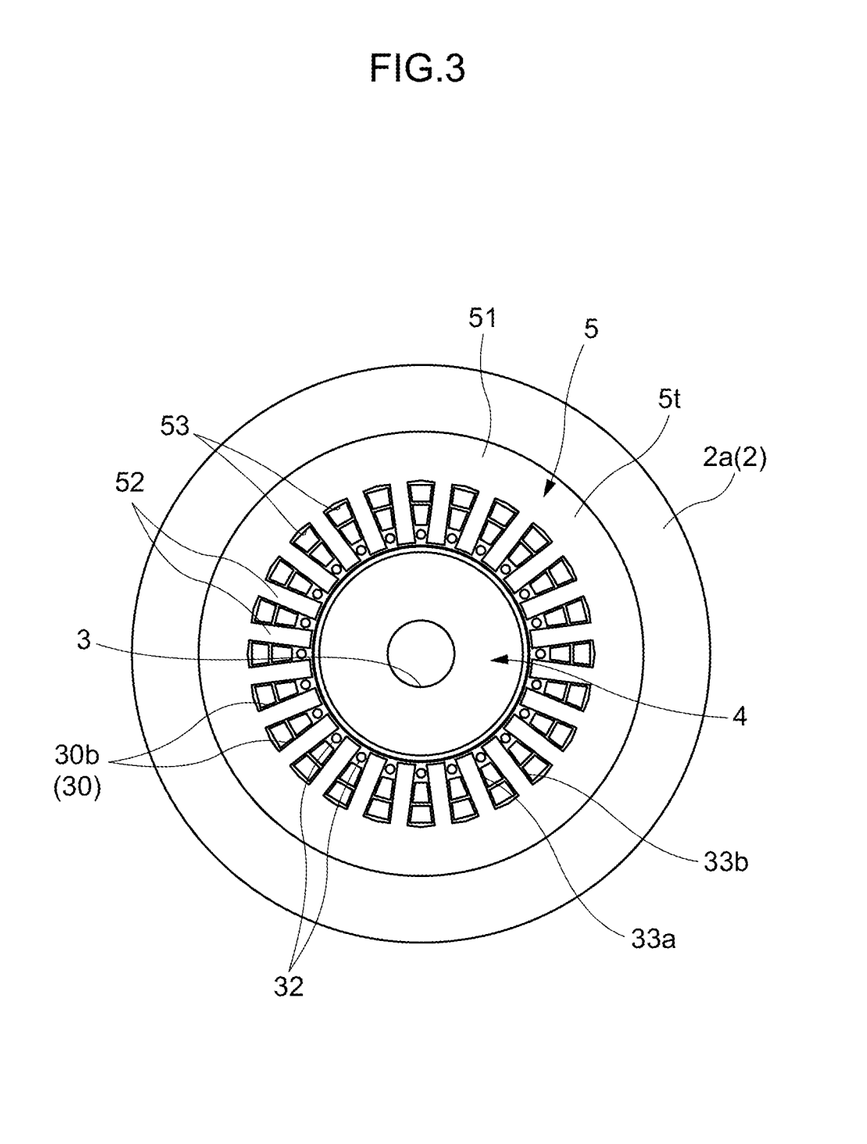
FIG. 3 is a horizontal sectional view taken along line A-A of FIG. 1.
Figure 4:
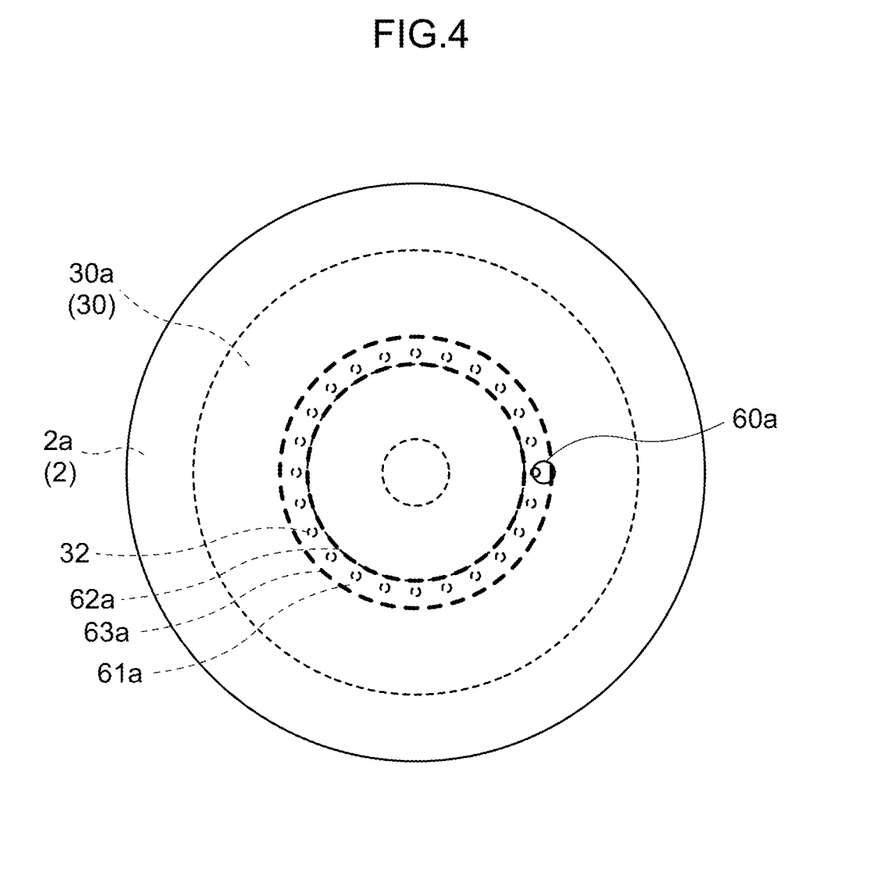
FIG. 4 is a top view of a housing.
Figure 5:
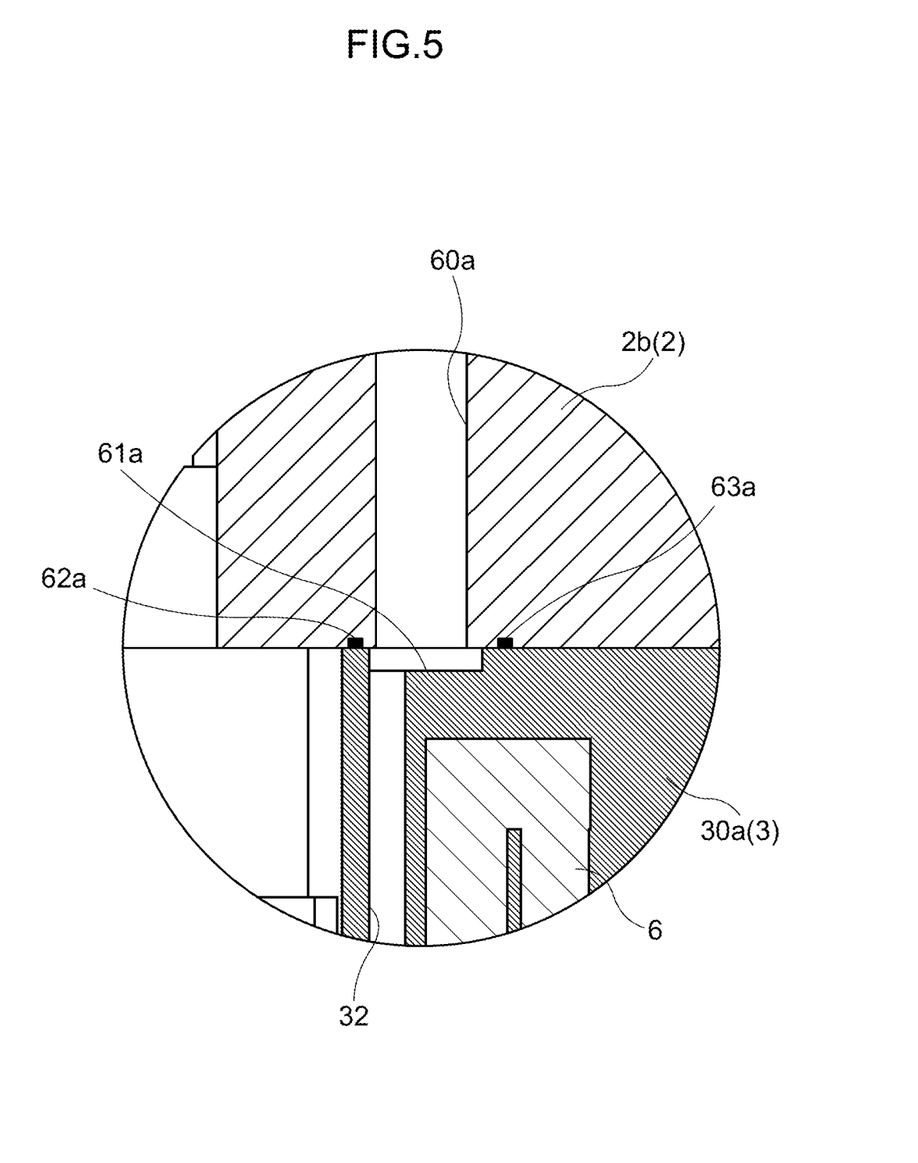
FIG. 5 is a partial perspective view illustrating a configuration of a mold resin portion.

As illustrated in FIG. 3, the stator 5 includes a plurality of laminated plates 5t formed to be laminated in an axial direction thereof, and is provided with an annular yoke 51 located on the outer side, and a plurality of teeth 52 protruding from an inner peripheral surface of the yoke 51 toward the motor shaft 3. A gap between the teeth 52 that are adjacent to each other is referred to as a slot 53, and the number of the slots 53 that are provided is the same as the number of the teeth 52.

Figure 6:
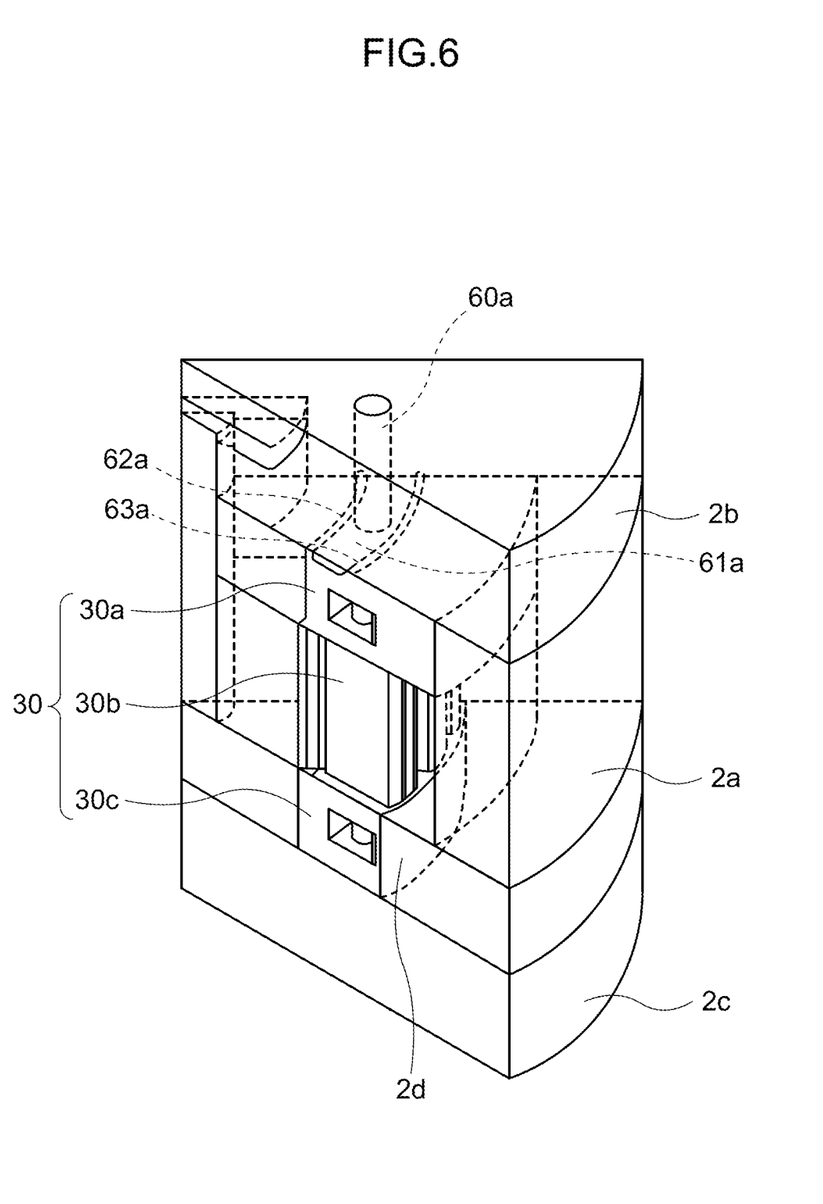
FIG. 6 is a partial enlarged view of FIG. 1.
Figure 7:
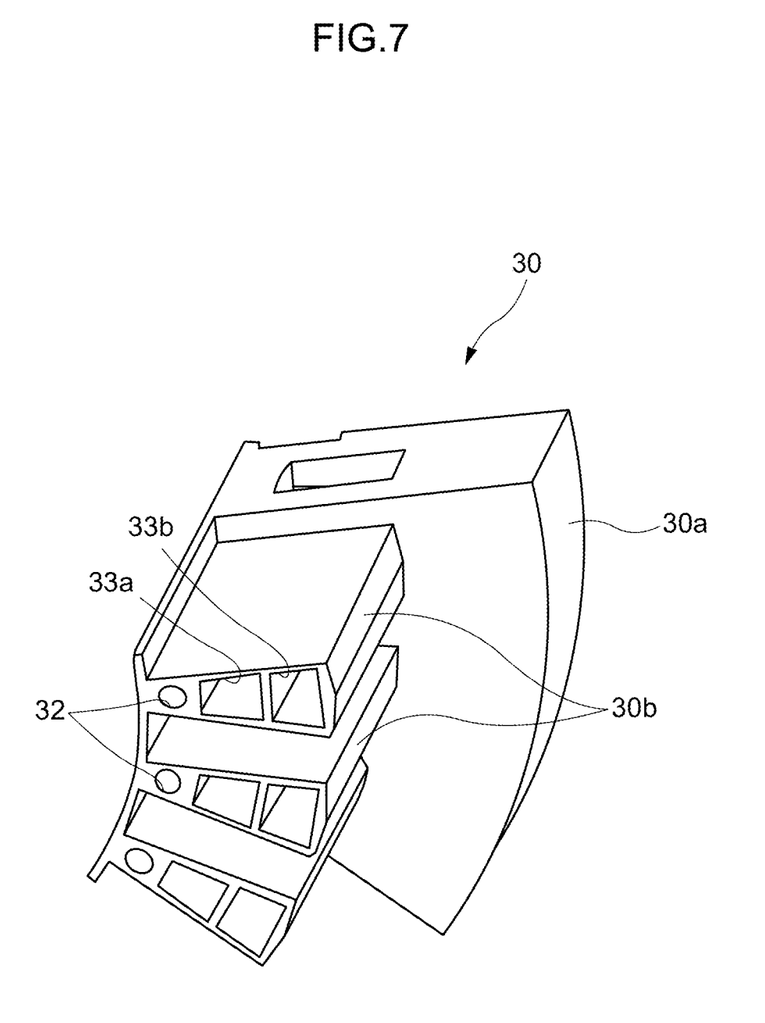
FIG. 7 is a perspective view of a mold resin portion, which has been cut at the central part in an axial direction thereof, as seen from below.

In the slots 53 formed between the teeth 52 that are adjacent to each other, coils 6 wound around the teeth 52 are respectively arranged. In FIGS. 3, 6 and 7, illustration of the coils 6 wound around the teeth 52 is omitted.

The stator 5 includes a mold resin portion 30 in which the plurality of laminated plates 5t and the coils 6 are molded. That is, the mold resin portion 30 is an element obtained by mold forming by using a resin material, such as epoxy resin or polyester resin, with the coils 6 being wound around the teeth 52 of the stator 5. The mold resin portion 30 has insulating properties, and adhesiveness between the mold resin portion 30 and the coil 6 is high.

The mold resin portion 30 includes a first mold portion 30a disposed above the stator 5, a plurality of second mold portions 30b disposed inside each of a plurality of slots 53, and a third mold portion 30c disposed below the stator 5. The first mold portion 30a is connected to upper end portions of the plurality of second mold portions 30b, and lower end portions of the plurality of second mold portions 30b are connected to the third mold portion 30c.

That is, in the mold resin portion 30, the first mold portion 30a and the third mold portion 30c are connected to each other by the plurality of second mold portions 30b. The first mold portion 30a, the plurality of second mold portions 30b, and the third mold portion 30c are connected along an axial direction of the stator 5. Inner peripheral portions of the plurality of second mold portions 30b are connected in a circumferential direction, and play the role as a wedge.

The mold resin portion 30 includes a flow path 32 for a cooling medium to which a cooling medium is supplied. In each of the plurality of slots 53, one second mold portion 30b is disposed, and in each second mold portion 30b, one flow path 32 is disposed along the axial direction of the stator 5.

Each flow path 32 is formed to pass through one slot 53, and the mold resin portion 30 includes a plurality of flow paths 32 formed in every one of the slots 53 of the plurality of slots 53, respectively. In the present embodiment, the flow path 32 for the cooling medium is formed by a through hole penetrating in an axial direction of the second mold portion 30b.

An upper end portion of the flow path 32 formed in the second mold portion 30b extends to an upper end surface of the first mold portion 30a, and a lower end portion of the flow path 32 extends to a lower end surface of the third mold portion 30c. Consequently, the flow path 32 penetrates from an upper end surface to a lower end surface of the mold resin portion 30.

The flow path 32 is disposed closer to the rotor 4 side than the coil 6 with respect to a radial direction, within the slot 53. That is, within the slot 53, the flow path 32 is disposed radially outside relative to a gap (a gap portion) between the stator 5 and the rotor 4, and radially inside relative to the coil 6.

In the second mold portion 30b, two coil passage portions 33a and 33b, which are disposed radially outside each flow path 32, are formed. The coil passage portion 33a is disposed radially outside the flow path 32, and the coil passage portion 33b is disposed radially outside the coil passage portion 33a. That is, when mold forming is performed by using a resin material with the coils 6 being wound around the teeth 52 of the stator 5, as the second mold portions 30b are formed around the coils 6, the coil passage portions 33a and 33b are formed.

On the upper end surface of the mold resin portion 30, or more specifically, the upper end surface of the first mold portion 30a, an annular groove portion 61a is formed. On the lower end surface of the mold resin portion 30, or more specifically, the lower end surface of the third mold portion 30c, an annular groove portion 61b is formed. The annular groove portions 61a and 61b are formed to be concave at the upper end surface and the lower end surface of the mold resin portion 30. An upper end of each of the plurality of flow paths 32 is open at a bottom surface of the groove portion 61a, and a lower end of each of the plurality of flow paths 32 is open at a bottom surface of the groove portion 61b. Accordingly, the plurality of flow paths 32 communicate with each of the annular groove portions 61a and 61b.

The housing 2 includes a cylindrical portion 2a, and two cover members 2b and 2c which close both sides of the cylindrical portion 2a. The cylindrical portion 2a is disposed along a vertical direction, the cover member 2b closes an upper end of the cylindrical portion 2a, and the cover member 2c closes a lower end of the cylindrical portion 2a. Hole portions 12a are formed in the cover members 2b and 2c, respectively, and a bearing portion 12b which rotatably and pivotally supports the motor shaft 3 is disposed in each of the hole portions 12a. A space between the cover member 2b and the motor shaft 3, and a space between the cover member 2c and the motor shaft 3 are sealed by an annular seal member 12c.

A supply port 60a for a cooling medium is formed in the cover member 2b of the housing 2. The supply port 60a is so formed as to penetrate through the cover member 2b in an up-down direction, in which a lower end of the supply port 60a is located above the groove portion 61a formed on the upper end surface of the mold resin portion 30, and the supply port 60a communicates with the groove portion 61a.

Similarly, a discharge port 60b for the cooling medium is formed in the cover member 2c of the housing 2. The discharge port 60b is so formed as to penetrate through the cover member 2c in the up-down direction, in which an upper end of the discharge port 60b is located below the groove portion 61b formed on the lower end surface of the mold resin portion 30, and the discharge port 60b communicates with the groove portion 61b.

An outer peripheral surface of the mold resin portion 30 is in contact with an inner peripheral surface of the cylindrical portion 2a, and both end portions of the mold resin portion 30 are disposed to be opposed to the two cover members 2b and 2c, respectively. In other words, the upper end surface of the mold resin portion 30 is opposed to a lower surface of the cover member 2b, and the lower end surface of the mold resin portion 30 is opposed to an upper surface of the cover member 2c. A step portion 2d protruding to the inner side in the radial direction is formed in a lower end portion of the cylindrical portion 2a, and an upper surface of the step portion 2d is in contact with a lower surface of the stator 5.

Four annular seal members 62a, 63a, 62b, and 63b are disposed between both end surfaces of the mold resin portion 30 and the two cover members 2b and 2c. That is, two annular seal members 62a and 63a are disposed between the upper end surface of the mold resin portion 30 and the lower surface of the cover member 2b. Also, two annular seal members 62b and 63b are disposed between the lower end surface of the mold resin portion 30 and the upper surface of the cover member 2c.

Between the upper end surface of the mold resin portion 30 and the lower surface of the cover member 2b, the annular seal member 62a is disposed radially inside the groove portion 61a, and the annular seal member 63a is disposed radially outside the groove portion 61a. Between the lower end surface of the mold resin portion 30 and the upper surface of the cover member 2c, the annular seal member 62b is disposed radially inside the groove portion 61a, and the annular seal member 63b is disposed radially outside the groove portion 61a.

In the motor 1 of the present embodiment, a space at the inner side relative to an inner peripheral surface of the stator 5 is maintained in a decompressed state. Therefore, the rotor 4 is rotated in a decompression space.

As illustrated in FIG. 2, a pump 65 is connected to the supply port 60a and the discharge port 60b for the cooling medium via connection pipes 64a and 64b. Thus, when the pump 65 is driven, the cooling medium is supplied to the supply port 60a via the connection pipe 64a. The cooling medium supplied to the supply port 60a passes through the groove portion 61a, and is supplied to the flow path 32 of the mold resin portion 30. The cooling medium which has passed through the flow path 32 downwardly passes through the groove portion 61b and reaches the discharge port 60b. The cooling medium which has reached the discharge port 60 is returned to the pump 65 via the connection pipe 64b to be circulated.

Figure 8:
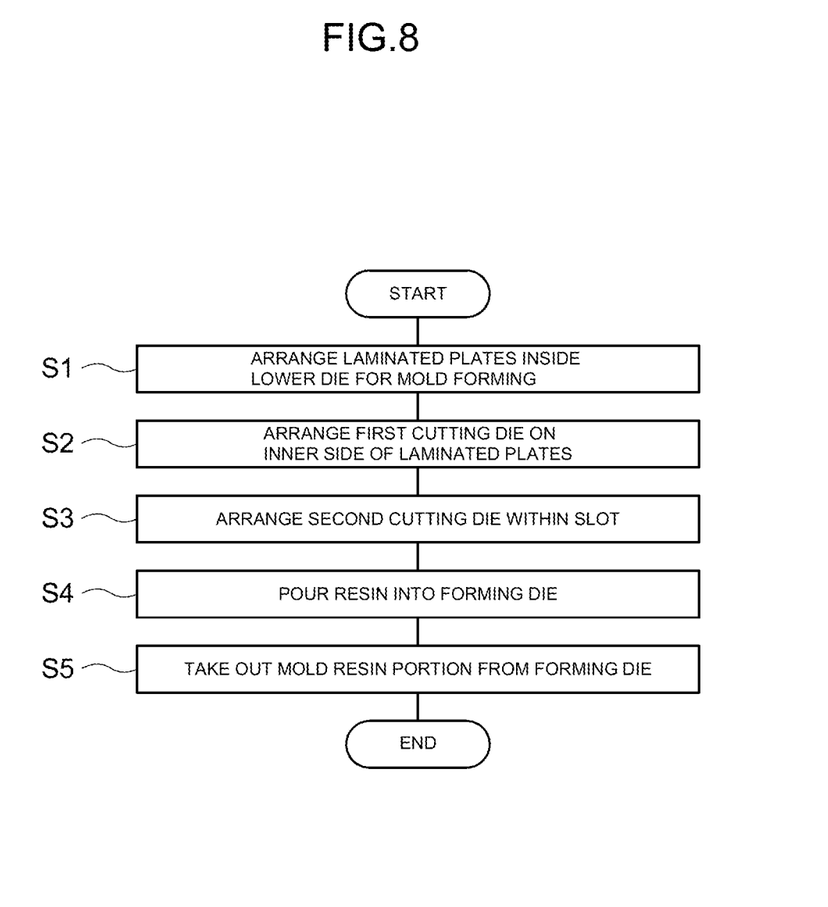
FIG. 8 is a flowchart illustrating a method of manufacturing a stator of FIG. 1.

A method of manufacturing the stator 5 used in the motor 1 of the present embodiment will be described with reference to FIG. 8.

(Step S1)

The coils 6 are wound around the teeth 52 formed by the plurality of laminated plates 5t formed to be laminated, and the plurality of laminated plates 5t on which the coils 6 are wound are arranged inside a cylindrical lower die for mold forming. At the bottom of the lower die for mold forming, a step portion, which is of the same shape as the step portion 2d formed in the cylindrical portion 2a of the housing 2 of the motor 1, is formed.

(Step S2)

In the interior of the lower die for mold forming, a columnar first cutting die is arranged on the inner side of the plurality of laminated plates 5t on which the coils 6 are wound. The first cutting die is used to form the inner peripheral surface of the stator 5, and to form a space in which the rotor 4 is to be disposed radially inside the stator 5, and the diameter of the first cutting die is slightly greater than the diameter of the rotor 4.

(Step S3)

In the interior of the lower die for mold forming, one columnar second cutting die is arranged within each of the plurality of slots 53 in the plurality of laminated plates 5t on which the coils 6 are wound. The second cutting die is used to form the flow path 32 for a cooling medium within the plurality of slots 53. A plurality of second cutting dies are disposed in every one of the plurality of slots 53, respectively.

(Step S4)

An upper die for mold forming is mounted onto the lower die for mold forming, and the plurality of laminated plates 5t on which coils 6 are wound are accommodated inside a forming die formed of the upper die for mold forming and the lower die for mold forming. A resin supply port is formed in the upper die for mold forming, and resin is poured into the forming die through the resin supply port of the upper die for mold forming. Thereafter, a resin 52 is cured in the forming die by cooling or heating. Consequently, the mold resin portion 30 is formed.

(Step S5)

When the resin 52 is cured in the forming die, the forming die is separated, and the mold resin portion 30 in which the plurality of laminated plates 5t and the coils 6 are molded is taken out. When the first cutting die arranged on the inner side of the plurality of laminated plates 5t, and the second cutting dies arranged within the plurality of slots 53 in the plurality of laminated plates 5t are removed from the mold resin portion 30, manufacturing of the stator 5 including the mold resin portion 30 in which the plurality of laminated plates 5t and the coils 6 are molded is completed. In the stator 5 which has been manufactured, a space in which the rotor 4 is disposed is formed at a part where the first cutting die is removed, and the flow paths 32 within the plurality of slots 53 are also formed at parts where the second cutting dies are removed.

As described above, the motor 1 of the present embodiment corresponds to a motor including the stator 5, and the rotor 4, which is disposed with a gap from the stator 5, being arranged in the housing 2, in which the stator 5 is provided with a plurality of laminated plates 5t forming the yoke 51 having an annular shape, and the plurality of teeth 52 protruding from an inner peripheral portion of the yoke 51 toward the rotor 4; the slots 53 in which the coils 6 wound around the teeth 52 are arranged are respectively formed between the teeth 52 that are adjacent to each other; the stator 5 includes the mold resin portion 30 in which the plurality of laminated plates 5t and the coils 6 are molded; the mold resin portion 30 includes the flow path 32 formed within at least one slot 53 among a plurality of slots 53; and the flow path 32 is supplied with a cooling medium.

As can be seen, according to the present embodiment, the mold resin portion 30 in which the plurality of laminated plates 5t and the coils 6 are molded in the stator 5 includes the flow paths 32 for a cooling medium, which are formed within every one of the slots 53, respectively. Thus, it is possible to form a stator including the flow paths 32 to which a cooling medium is supplied by using a conventional laminated plate and without using a dedicated laminated plate for forming the flow paths 32 to which the cooling medium is supplied. In addition, since the flow paths 32 to which the cooling medium is supplied are formed in the mold resin portion 30, it is possible to suppress an increase in eddy-current loss which is caused by a magnetic flux generated in the stator 5 or the rotor 4, thereby preventing the motor efficiency from decreasing.

In this case, each of the flow paths 32 is disposed closer to the rotor 4 side than the coil 6 within the slot 53.

By such a configuration, it is possible to have the flow path 32 arranged closer to the rotor 4 side than the coil 6 within the slot 53. Therefore, since the flow paths 32 are disposed near a gap (a gap portion) between the stator 5 and the rotor 4, which causes the temperature of a portion near the rotor 4 in the stator 5 to be lowered, it is possible to reduce a rise in temperature of the rotor 4 caused by radiation from the stator 5. Accordingly, the life of the bearing 12b is increased by suppressing an increase in the bearing temperature of the motor shaft 3 supporting the rotor 4.

Specifically, the housing 2 includes the cylindrical portion 2a, and two cover members 2b and 2c which close both sides of the cylindrical portion 2a; the mold resin portion 30 includes the plurality of flow paths 32 which pass through every one of the plurality of slots 53, respectively, and the annular groove portions 60a and 60b, which are formed on the both end surfaces of the mold resin portion 30, respectively, and communicate with the plurality of flow paths 32; an outer peripheral portion of the mold resin portion 30 is in contact with the inner peripheral surface of the cylindrical portion 2a; and the both end portions of the mold resin portion 30 are disposed to be opposed to the two cover members 2b and 2c, respectively.

Consequently, the annular groove portions 60a and 60b, which communicate with the plurality of flow paths 32 that pass through every one of the plurality of slots 53, respectively, are formed on the both end surfaces of the mold resin portion 30. Therefore, by allowing a cooling medium to be supplied to the groove portions 60a and 60b of the mold resin portion 30, the cooling medium is made to pass through the plurality of flow paths 32.

Further, in the above motor 1, the annular seal members 62a, 62b, 63a, and 63b, which are disposed radially inside and radially outside the groove portions 60a and 60b, respectively, are disposed between the both end surfaces of the mold resin portion 30 and the two cover members 2b and 2c.

Consequently, it is possible to prevent the cooling medium from leaking out inside the motor 1, and also maintain the interior of the housing 2 to be decompressed.

Further, the rotor 4 of the motor 1 is rotated in a decompression space.

Consequently, in the decompression space, since generation of a convection flow is significantly reduced even when the rotor 4 is rotated, the heat of the rotor 4 is confined. Even in such a case, the temperature of the rotor 4 can be lowered in the present invention.

Further, a method of manufacturing the stator 5 corresponds to a method of manufacturing the stator 5 including a plurality of laminated plates 5t forming the annular yoke 51 and the plurality of teeth 52 protruding from an inner peripheral portion of the yoke 51 toward the rotor 4, in which the method includes: a first step of winding the coils 6 around the teeth 52, and arranging the plurality of laminated plates 5t on which the coils 6 are wound inside a lower die for mold forming: a second step of arranging, in the interior of the lower die for mold forming, a first cutting die for forming an inner peripheral surface of the stator 5 on the inner side of the plurality of laminated plates 5t on which the coils 6 are wound; a third step of arranging, in the interior of the lower die for mold forming, a second cutting die for forming the flow path 32 for a cooling medium within at least one slot 53 of the plurality of slots 53, which are formed between the teeth 52 that are adjacent to each other, in the plurality of laminated plates 5t on which the coils 6 are wound; a fourth step of forming a forming die by mounting an upper die for mold forming onto the lower die for mold forming, and pouring resin into the forming die and curing the resin; and a fifth step of taking out, after the resin has been cured in the forming die, the mold resin portion 30 in which the plurality of laminated plates 5t and the coils 6 are molded from the forming die, and removing the first cutting die and the second cutting die from the mold resin portion 30.

Consequently, according to the method of manufacturing the stator 5 of the present embodiment, the mold resin portion 30 in which the plurality of laminated plates 5t and the coils 6 are molded in the stator 5 includes the flow paths 32 for a cooling medium, which are formed within every one of the slots 53, respectively. Thus, it is possible to form the stator 5 including the flow paths 32 to which a cooling medium is supplied by using a conventional laminated plate and without using a dedicated laminated plate for forming the flow paths 32 to which the cooling medium is supplied. In addition, since the flow paths 32 to which the cooling medium is supplied are formed in the mold resin portion 30, in the motor 1 including the stator 5 and the rotor 4, it is possible to suppress an increase in eddy-current loss which is caused by a magnetic flux generated in the stator 5 or the rotor 4, thereby preventing the motor efficiency from decreasing.

Note that the specific configuration is not limited only to the embodiment described above.

In the above embodiment, the mold resin portion 30 includes a plurality of flow paths 32 formed in every one of the slots 53 of the plurality of slots 53, respectively. However, the motor of the present invention includes one provided with a mold resin portion 30 including a flow path 32 formed within at least one slot 53 among the plurality of slots 53.

In the above embodiment, in the mold resin portion 30, the flow path 32 formed within the slot 53 is formed by a through hole which penetrates through the mold resin portion 30. However, the flow path 32 formed within the slot 53 is not limited to a through hole. For example, the number, the shape, a cross-sectional shape and the like of the flow path 32 formed within one slot 53 are arbitrary.

In the above embodiment, the flow path 32 is disposed closer to the rotor 4 side than the coils 6 within the slot 53. However, the arrangement of the flow path 32 within the slot 53 is not limited to the above.

In the above embodiment, the plurality of flow paths 32 communicate with the groove portions 61a and 61b, and a cooling medium is supplied to the plurality of flow paths 32 through the groove portions 61a and 61b. However, the cooling medium may be supplied to the plurality of flow paths 32 without passing through the groove portions 61a and 61b.

In the above embodiment, while the seal member 12c is arranged between the housing 2 and the motor shaft 3, a member to be arranged is not limited to the above. A space between the housing 2 and the motor shaft 3 may be sealed by, for example, liquid packing or a metal seal.

In the above embodiment, the motor 1 in which the rotor 4 is rotated in a decompression space has been described. However, the motor of the present invention is not limited to a motor in which the rotor is rotated in a decompression space.

In the above embodiment, while an inner rotor type motor 1 has been described, the present invention is applicable to an outer rotor type motor.

Also, in the above embodiment, while a radial gap type motor 1 has been described, the present invention is applicable to an axial gap type motor.

In the above embodiment, the stator 5 is press-fitted and fixed to the housing 2, but the method of fixing the stator 5 to the housing 2 is not limited to the above. By forming a hole which penetrates through the laminated plate 5t of the stator 5 in the axial direction, and forming a screw hole in a surface which comes into contact with an end surface of the stator 5 at the housing 2, fixing to the housing 2 may be achieved by passage through the hole of the laminated plates 5t by use of a bolt.

INDUSTRIAL APPLICABILITY

The present invention can be utilized as a motor including a coil wound on a stator and a method of manufacturing a stator.

REFERENCE SIGNS LIST

1 . . . Motor
2 . . . Housing
2a . . . Cylindrical portion
2b, 2c . . . Cover member
4 . . . Rotor
5 . . . Stator
5t . . . Laminated plate
6 . . . Coil
30 . . . Mold resin portion
32 . . . Flow path
51 . . . Yoke
52 . . . Teeth
53 . . . Slot
60a, 60b . . . Groove portion
62a, 62b, 63a, 63b . . . Annular seal member

The invention claimed is:

1. A motor comprising a stator, and a rotor which is disposed with a gap from the stator, the motor being arranged in a housing, wherein:

the stator comprises a plurality of laminated plates forming an annular yoke and a plurality of teeth protruding from an inner peripheral portion or an outer peripheral portion of the yoke toward the rotor;

slots in which coils wound around the teeth are arranged are respectively formed between the teeth that are adjacent to each other;

the stator includes a mold resin portion in which the plurality of laminated plates and the coils are completely surrounded by the mold resin portion such that the cooling medium does not contact the coils;

the mold resin portion includes a coil passage portion formed around the coils and a flow path that penetrates in the axial direction so as to pass through at least one slot among the plurality of slots, the flow path formed away from the coil passage portion; and the flow path is disposed closer to the rotor than the coil within the slot, an inner wall of the flow path is formed from a resin material that forms the mold resin portion, the flow path is supplied with a cooling medium.

2. The motor according to claim 1, wherein:

the housing includes a cylindrical portion, and two cover members which close both sides of the cylindrical portion;

the mold resin portion includes
 a plurality of flow paths which pass through every one of the slots, respectively, and
 annular groove portions, which are formed on both end surfaces of the mold resin portion, respectively, and communicate with the plurality of flow paths; and an outer peripheral portion of the mold resin portion is in contact with an inner peripheral surface of the cylindrical portion, and both end portions of the mold resin portion are disposed to be opposed to the two cover members, respectively.

3. The motor according to claim 2, wherein two annular seal members, which are disposed radially inside and radially outside the groove portion, respectively, are disposed in places between the both end surfaces of the mold resin portion and the two cover members.

4. The motor according to claim 3, wherein the rotor is rotated in a decompression space.

5. The motor according to claim 2, wherein the rotor is rotated in a decompression space.

6. The motor according to claim 1, wherein the rotor is rotated in a decompression space.

7. A motor comprising a stator, and a rotor which is disposed with a gap from the stator, the motor being arranged in a housing, wherein:

the stator comprises a plurality of laminated plates forming an annular yoke and a plurality of teeth protruding from an inner peripheral portion or an outer peripheral portion of the yoke toward the rotor;

slots in which coils wound around the teeth are arranged are respectively formed between the teeth that are adjacent to each other;

the stator includes a mold resin portion in which the plurality of laminated plates and the coils are molded;

the mold resin portion includes a coil passage portion formed around the coils and a flow path that penetrates in the axial direction so as to pass through at least one slot among the plurality of slots, the flow path formed away from the coil passage portion; and the flow path is disposed closer to the rotor than the coil within the slot, the flow path is supplied with a cooling medium, wherein the housing includes a cylindrical portion, and two cover members which close both sides of the cylindrical portion;

the mold resin portion includes
 a plurality of flow paths which pass through every one of the slots, respectively, and
 annular groove portions, which are formed on both end surfaces of the mold resin portion, respectively, and communicate with the plurality of flow paths; and an outer peripheral portion of the mold resin portion is in contact with an inner peripheral surface of the cylindrical portion, and both end portions of the mold resin portion are disposed to be opposed to the two cover members, respectively, wherein two annular seal members, which are disposed radially inside and radially outside the groove portion, respectively, are disposed in places between the both end surfaces of the mold resin portion and the two cover members.

8. The motor according to claim 7, wherein the rotor is rotated in a decompression space.

* * * * *